Jan. 25, 1966   A. F. PEZZOLI   3,230,804
CONTINUOUSLY ROTATING TUBE CUTTING MACHINE
Filed Sept. 13, 1962   7 Sheets-Sheet 2

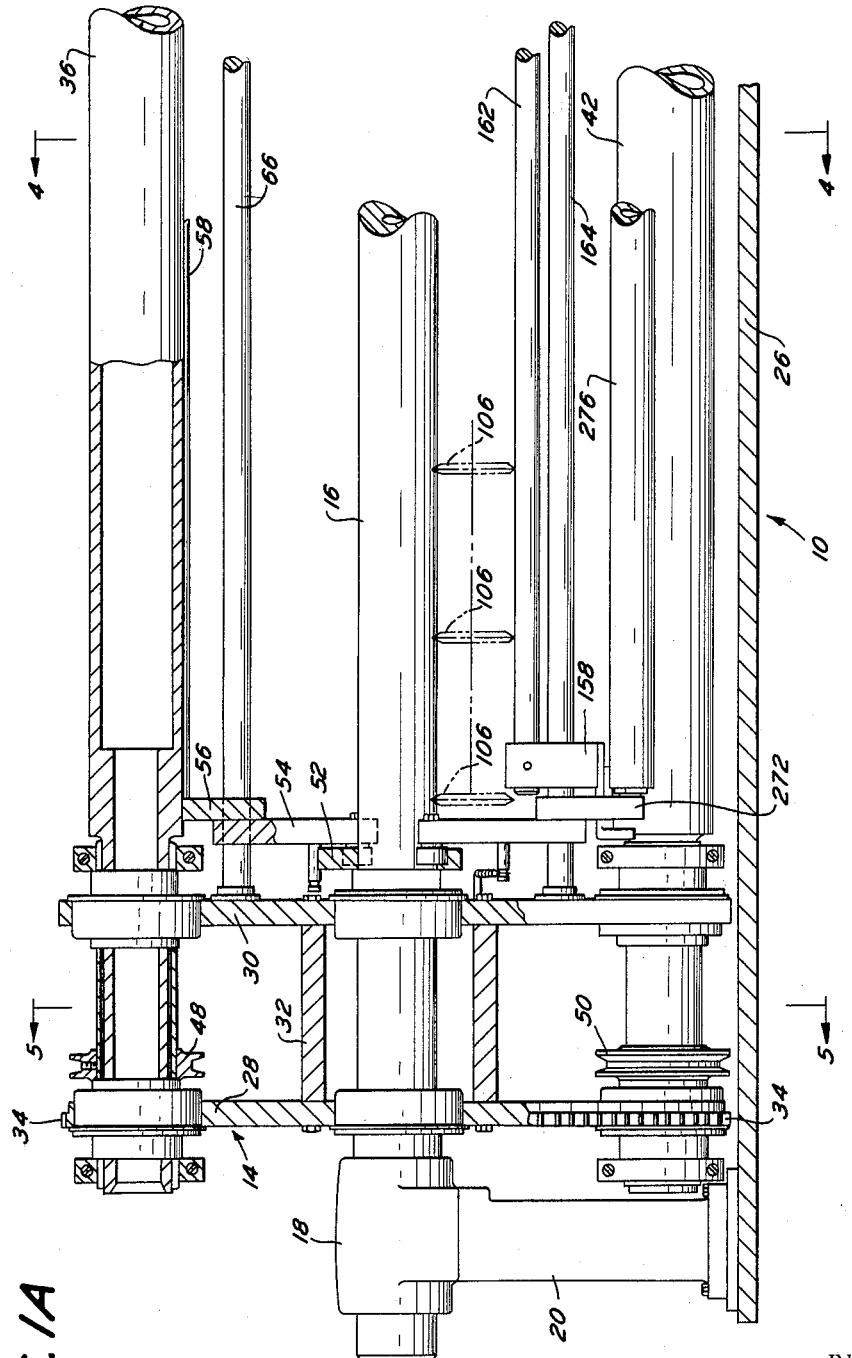

INVENTOR.
ARTHUR F. PEZZOLI
BY
Arthur H. Seidel
ATTORNEY

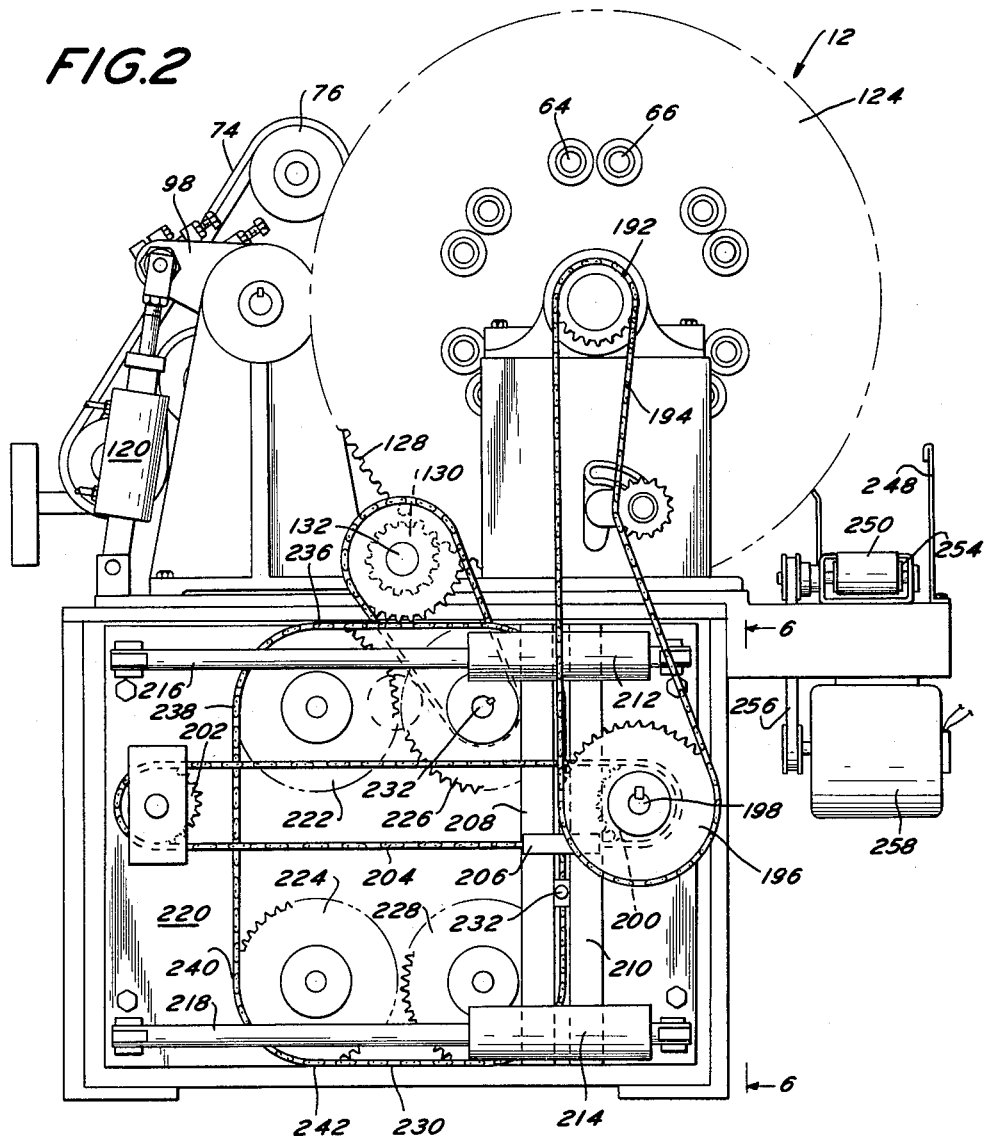

Jan. 25, 1966  A. F. PEZZOLI  3,230,804
CONTINUOUSLY ROTATING TUBE CUTTING MACHINE
Filed Sept. 13, 1962  7 Sheets-Sheet 4

INVENTOR.
ARTHUR F. PEZZOLI
BY
ATTORNEY

Jan. 25, 1966 A. F. PEZZOLI 3,230,804
CONTINUOUSLY ROTATING TUBE CUTTING MACHINE
Filed Sept. 13, 1962 7 Sheets-Sheet 5

INVENTOR.
ARTHUR F. PEZZOLI
BY
ATTORNEY

Jan. 25, 1966   A. F. PEZZOLI   3,230,804
CONTINUOUSLY ROTATING TUBE CUTTING MACHINE
Filed Sept. 13, 1962   7 Sheets-Sheet 7

INVENTOR.
ARTHUR F. PEZZOLI
BY
Arthur H. Seidel
ATTORNEY

# United States Patent Office 3,230,804
Patented Jan. 25, 1966

3,230,804
CONTINUOUSLY ROTATING TUBE CUTTING MACHINE
Arthur F. Pezzoli, Upper Darby, Pa., assignor to Dietz Machine Works, Inc., Philadelphia, Pa., a corporation of Pennsylvania
Filed Sept. 13, 1962, Ser. No. 223,475
14 Claims. (Cl. 82—85)

This invention relates to a continuously rotating tube cutting machine, and more particularly, to a cutting machine having continuously rotating mandrels associated with means for feeding tubes to be cut onto the mandrels and for removing cut tubes from the mandrels.

The cutting machine of the present invention is referred to by those skilled in the art as a recutter. A recutter is designed to recut uniform lengths of tubing into smaller lengths. The present invention is particularly designed for recutting tubes of paper or paper-like material which have a thin wall thickness. The machine of the present invention is particularly adapted for use with tubes having a wall thickness of approximately $\frac{1}{32}$ of an inch.

All of the known recutters proposed heretofore are of intermittently operated type. Due to the large mass of the moving parts, the maximum rate of production of such intermittently operated recutters is limited. At the present time, the fastest recutter of the intermittently operated type will recut approximately 35 tubes per minute. The machine of the present invention is designed so as to have a minimum productive capacity of 60 tubes per minute.

This substantial doubling of the productive capacity of the recutter of the present invention is accomplished by a structural interrelationship which facilitates the continuous rotating of the mandrels on which the tubes will be cut.

The present invention includes a turret having a plurality of mandrels extending therefrom and supported thereby in cantilever fashion. A means is provided to continuously rotate the turret at a uniform speed. A loading turret is associated with the mandrel turret and means are provided to assure that both turrets rotate at the same rate of speed in the same direction. Various devices are associated with the laoding turret which facilitates transfer of uncut tubes from the loading turret onto the mandrels and removal from the mandrels after the tube has been recut into a plurality of smaller lengths.

The cutting action is preferably effected by a plurality of rotating knives which are individually adjustable for pressure. A means is provided to rotate the mandrel only during that portion of its rotary cycle when it is in the vicinity of the rotating knives. A conveyer device is provided to feed mandrels onto the loading turret and a second conveyer device is provided to receive the smaller cut lengths of the tube and convey the same away from the cutting machine of the present invention.

A means is provided to back up the rotating mandrels adjacent the cutting knives. Such means includes a pair of back up rollers which are actuated to provide support for the mandrel during the cutting action. In accomplishing the actuation of the various components of the machine of the present invention, all components are structurally interrelated with a single drive source so that intermittently operated timing devices are eliminated and positive assurance is provided that the cutting machine will perform over extended periods of time without a substantial degree of maintenance or attention by operating personnel. In this regard, the cutting machine is completely automatic and capable of operating 24 hours a day over extended periods of time.

It is an object of the present invention to provide a novel cutting machine.

It is another object of the present invention to provide a novel tube recutter, and method for recutting tubes.

It is another object of the present invention to provide a cutting machine having a continuously rotating turret supporting a plurality of mandrels in cantilever fashion, which mandrels are adapted to support tubes to be cut.

It is another object of the present invention to provide a novel cutting machine wherein a loading turret and a mandrel turret are simultaneously rotated in the same direction at the same rate of speed so that tubes to be cut on the loading turret may be automatically transferred onto and removed from mandrels supported by the mandrel turret.

It is another object of the present invention to provide a novel cutting machine wherein tubes to be cut are automatically transferred from a loading turret to a mandrel turret in response to the rotary disposition of the tube on the loading turret.

It is another object of the present invention to provide a novel cutting machine wherein continuously rotating cutting knives are individually adjustable toward and away from continuously rotating mandrels having tubes thereon.

Other objects will appear hereinafter.

For the purpose of illustrating the invention there is shown in the drawings forms which are presently preferred; it being understood, however, that this invention is not limited to the precise arrangements and instrumentalities shown.

FIGURE 1A is a partial longitudinal sectional view of the mandrel turret end of the machine of the present invention.

FIGURE 2 is an end view taken along the lines 2—2 in FIGURE 1B.

Figure 1B:
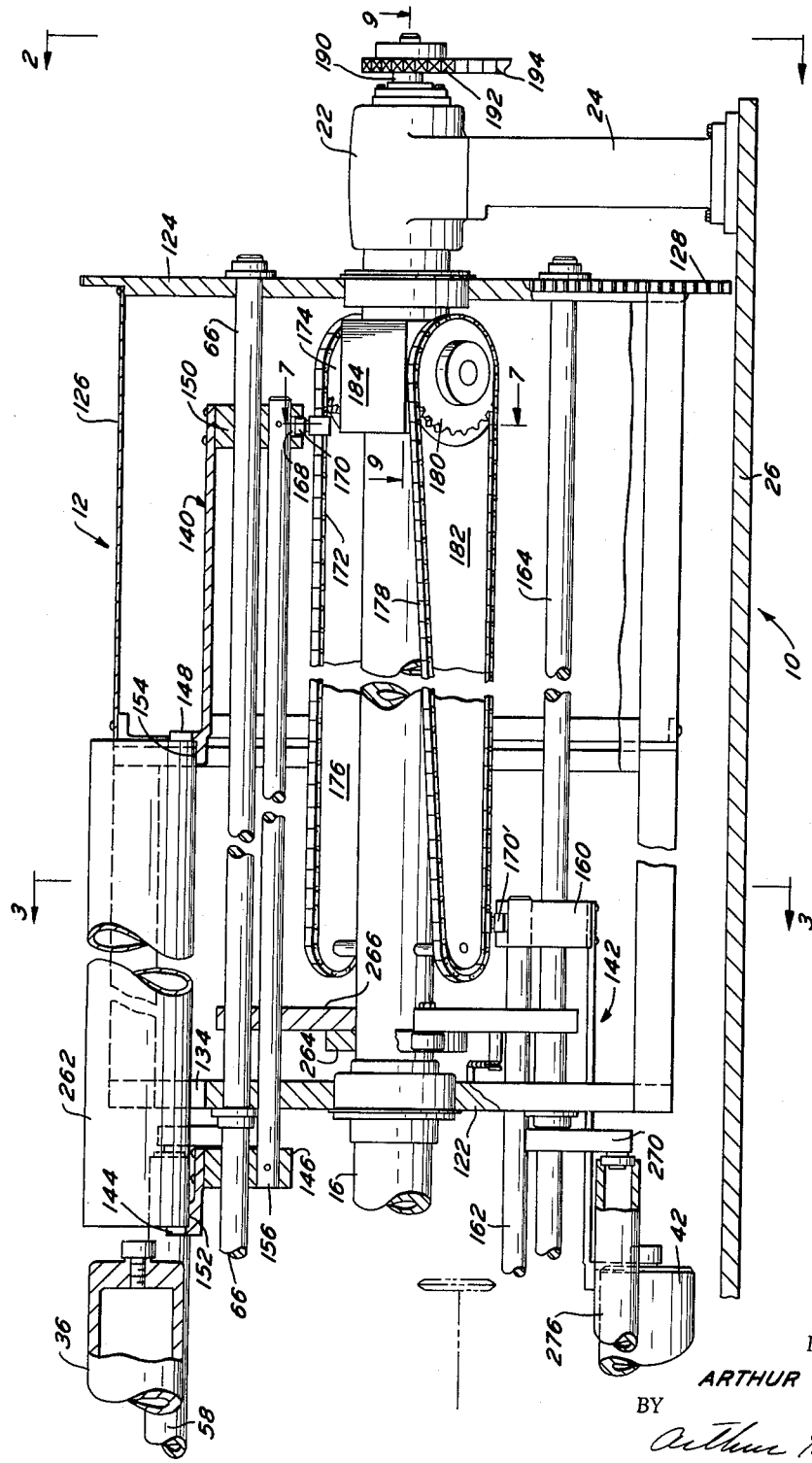
FIGURE 1B is a partial longitudinal sectional view of the loading turret end of the machine of the present invention.

Referring to the drawings in detail, wherein like numerals indicate like elements, there is shown in FIGURES 1A and 1B a cutting machine of the present invention designated generally as 10. Due to the length of the machine 10, the same cannot be illustrated in one view. In order to orientate the illustrations in FIGURES 1A and 1B, the right-hand end of FIGURE 1A should be juxtaposed to the left-hand end of the illustration in FIGURE 1B.

The cutting machine 10 includes a loading turret 12 illustrated more clearly in FIGURE 1B and a mandrel turret 14 in line with one another. Each of the turrets 12 and 14 is supported for rotation in the same direction at the same speed by means of a centrally disposed fixed shaft 16. Rotary bearings are disposed between the turrets and the central shaft 16 to support the same. The ends of the central shaft 16 are supported in bearings 18 and 22 which in turn are supported from a base plate 26 by standards 20 and 24, respectively.

The mandrel turret 14 includes a pair of spaced circular plates 28 and 30. A spacer sleeve 32 surrounds the central shaft 16 and is disposed between the plates 28 and 30. Any conventional means is provided to secure the plates 28 and 30 to the sleeve 32. Gear teeth 34 are provided on the outer peripheral surface of the plate 28.

Figure 4:
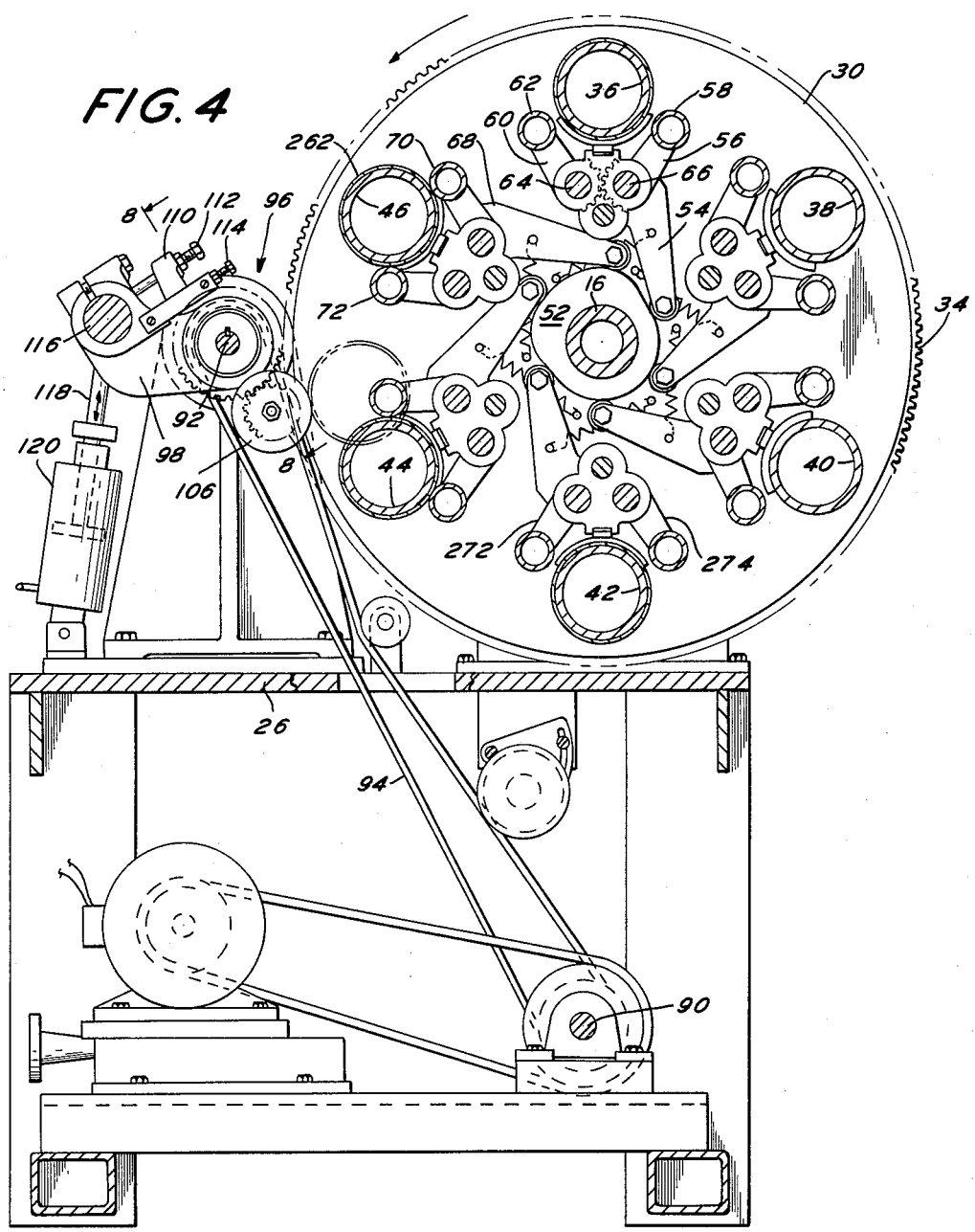
FIGURE 4 is a sectional view taken along the lines 4—4 in FIGURE 1A.

A plurality of mandrels 36, 38, 40, 42, 44 and 46 are supported in cantilever fashion at spaced points by the mandrel turret 14 as shown more clearly in FIGURE 4. While six such mandrels are illustrated, a greater or lesser number may be utilized. Since six mandrels are illustrated, they are spaced 60 arcuate degrees from one another at the same radius from the axis of the central shaft 16. As shown more clearly in FIGURE 1A, a pulley 48 is secured to the mandrel 36 between the plates 28 and 30. Also, a pulley 50 is secured to the mandrel 42 between the plates 28 and 30. The purpose of the pulleys which are secured to each of the mandrels 36–46 will be made clear hereinafter.

A cam 52, shown more clearly in FIGURE 4, is fixedly secured to the stationary central shaft 16 adjacent the plate 30. For each mandrel, there is a pair of back up rolls and an actuating mechanism to operate the same. Accordingly, only the back up rolls and actuating mechanism for the mandrels 36 and 46 will be described in detail.

A cam follower arm 54 is provided for the mandrel 36. The lowermost end of the arm 54 terminates in a cam follower which follows the contour of the cam 52. A spring is provided to bias the cam follower into contact with the cam surface on cam 52. Arm 54 is connected to a bracket arm 56. A free end of the bracket arm 56 rotatably supports a back up roll 58.

Bracket arm 56 is provided with a segmental gear which is in meshing engagement with a segmental gear on bracket arm 60. Bracket arm 60 supports at its free end the rotatable back up roll 62. In FIGURE 4, the back up rolls 58 and 62 are spaced from the outer peripheral surface of a tube to be cut and supported by the mandrel 36.

The bracket arms 60 and 56 are rotatably supported by shafts 64 and 66. The shafts 64 and 66 are parallel to one another and extend from the plate 30 through the loading turret 12. Hence, the ends of the shafts 64 and 66 are visible in FIGURE 2. The shafts 64 and 66 maintain a fixed rotary disposition between the loading turret 12 and the mandrel turret 14.

The mandrel 46 is provided with a cam follower arm 68 which is structurally interrelated with the cam 52 in the same manner as described above. As illustrated more clearly in FIGURE 4, the cam follower on arm 68 is in engagement with a protrusion of the cam 52 and hence is spaced farther away from the axis of the central shaft 16 than the cam follower on arm 54. As a result of the disposition of the cam follower on arm 68, a bracket arm supporting the back up roller 70 is rotated to a disposition where it is in rolling contact with the tube on mandrel 46. As a result of such rotation of the bracket arm supporting back up roll 70, its mating bracket arm has rotated in an opposite direction so that the back up roll 72 also is in rolling engagement with the periphery of a tube on mandrel 46. The points of contact between the back up rolls 70 and the tube on mandrel 46 are equidistant from an imaginary line extending through the axes of the central shaft 16 and the mandrel 46. Since the mandrels 36–46 are supported in cantilever fashion by the turret 14, the back up rolls for each mandrel provide additional support during the cutting action. Hence, it will be noted that only the back up rolls for mandrels 44 and 46 are in contact with a tube on the periphery of the mandrels, whereas the back up rollers are spaced from the remainder of the mandrels as a function of the contour of the cam 52.

Structure similar to that illustrated in FIGURE 4 for supporting the left-hand end of the back up rolls is also provided for the right-hand end of the back up rolls. The said structure for supporting the right-hand end of the back up rolls is responsive to a cam within the loading turret 12 and will be described in detail hereinafter.

Figure 5:
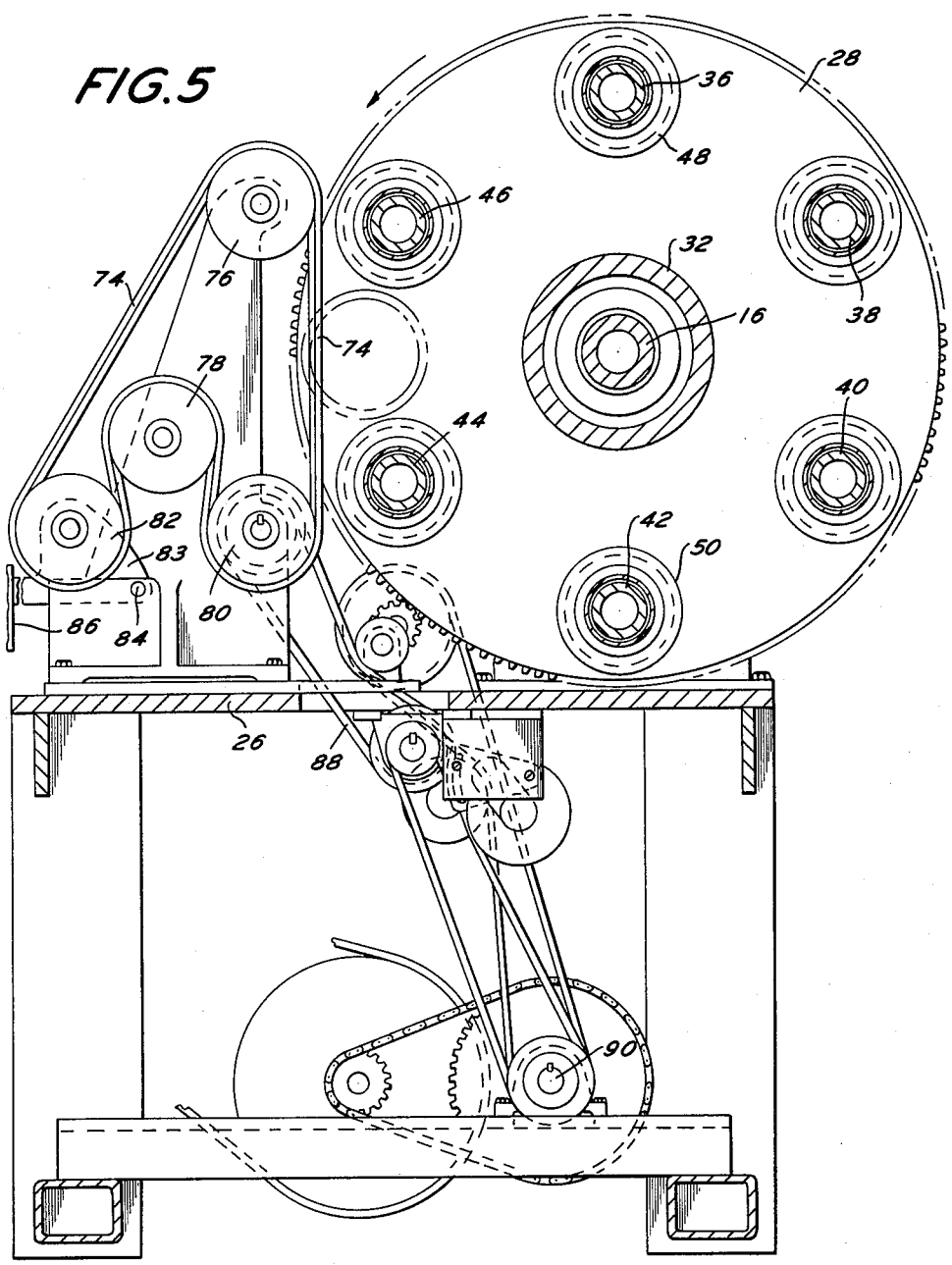
FIGURE 5 is a sectional view taken along the lines 5—5 in FIGURE 1A.

As shown more clearly in FIGURE 5, a double sided V-belt 74 is supported by a plurality of spaced pulleys 76, 78, 80 and 82. The pulleys are supported for rotation about an axis parallel to the axis of the central shaft 16. Pulley 82 is supported by a member 83. Member 83 is supported for pivotable movement about pin 84. Member 83 is provided with a counterweight 86 which tends to rotate member 83 in a counterclockwise direction in FIGURE 5.

The pulleys on the mandrels, such as pulley 48 on mandrel 36, are adapted to contact the double V-belt 74 at a point just below the 10 o'clock position and lose contact at a point just above the 8 o'clock position in FIGURE 5. During such contact, the mandrel will rotate about its longitudinal axis notwithstanding the fact that it is being rotated by the mandrel turret plates 28 and 30. Contact between the pulleys on the mandrels and the belt 74 causes the portion of belt 74 between pulleys 76 and 80 to move to the left in FIGURE 5. Such movement of the belt 74 causes the pulley 82 to rotate about pin 84. One of the pulleys for the belt 74, such as pulley 80, is a double sheave pulley driven by a double V-belt 88. A suitable drive connection is provided between the main drive shaft 90 and a pulley around which the belt 88 is disposed.

All rotary movement of the various components of the machine 10 are effected by coupling the components to the main drive shaft 90. The main drive shaft 90 is driven by a conventional sprocket and chain arrangement coupled to a driving motor. By using known coupling elements such as gears and pulley belts, and predetermined mechanical advantages, positive assurance is provided that all rotary components will be in timed relationship with one another without utilizing timing motors, intermittent driving motors, etc. Hence, the phase relationship between rotary components of the machine 10 will be predetermined to assure a proper operating relationship.

As shown more clearly in FIGURE 4, the main drive shaft 90 is coupled to a cutter drive shaft 92 by means of a pulley arrangement cooperating with a V-belt 94. A plurality of knife units 96 are disposed along the length of the cutter drive shaft 92. The number of such units 96 is determined by the number of individual pieces into which the tubes are to be recut. For example, if the tubes to be recut are 60 inches long, six cutter units may be utilized. Each of the cutter units 96 is identical and the position of the knife with respect to the tube to be cut is individually adjustable. Hence, it is only deemed necessary to describe one knife unit 96 in detail.

Figure 8:
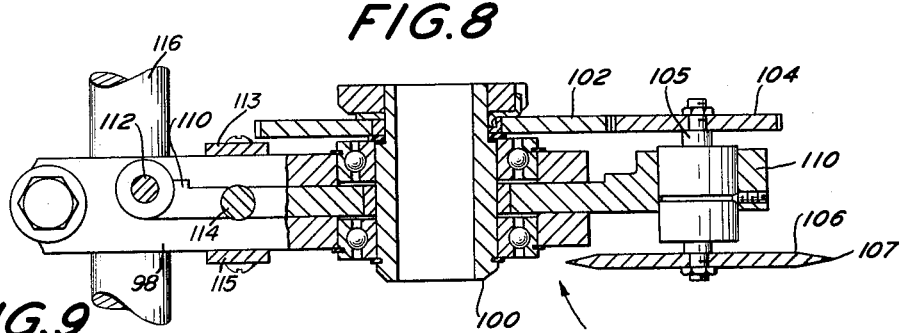
FIGURE 8 is a sectional view taken along the lines 8—8 in FIGURE 4.

As shown more clearly in FIGURES 4 and 8, each knife unit 96 includes a housing 98 having a rotatably supported sleeve 100 extending therethrough and offset to one side thereof. As shown more clearly in FIGURE 8, a gear 102 surrounds a reduced diameter portion of the sleeve 100 and is keyed thereto. The gear 102 is in meshing engagement with a gear 104. Gear 104 is keyed to a shaft 105 which supports the rotary knife 106. The periphery of the knife 106 has been machined to provide a cutting edge 107. The shaft 105 is rotatably supported in a bearing which extends through a support member 110. The support member 110 surrounds the sleeve 100 and is rotatably supported thereby in a slot in the housing 98.

The support member 110 is manually adjustable with respect to the housing 98 by means of adjusting bolts 112 and 114. The bolt 114 is threaded through a member supported above housing 98 by struts 113 and 115. The angular disposition of the knife 106 may be adjusted with respect to the shaft 92 by threading bolt 112 inwardly and threading bolt 114 outwardly. Such adjustment of bolts 112 and 114 will enable knife 106 to be adjusted clockwise about shaft 92 in FIGURE 4. Each housing 98 of the units 96 is coupled to a shaft 116 which in turn is coupled to a piston rod 118. The piston rod 118 terminates in a piston disposed within cylinder 120. The cylinder 120 is mounted for rotation through a limited angle of rotation with respect to the base plate 26. This piston and cylinder arrangement acts as a bias on the angular disposition of the housings 98 with respect to the shaft 92 and opposes the rotary force imparted to the housings by contact between the knives and the tubes to be cut and the mandrels supporting such tubes.

As shown more clearly in FIGURE 1B, the loading turret 12 includes a pair of spaced parallel plates 122 and 124. Gear teeth are provided on the periphery of plate 124 to rotatably drive the turret 12 in the same direction and at the same speed as the mandrel turret 14. To this end, the teeth 128 are in meshing engagement with a sprocket 120 on shaft 132. Shaft 132 is coupled to the main drive shaft 90 by conventional structure not shown.

Figure 3:
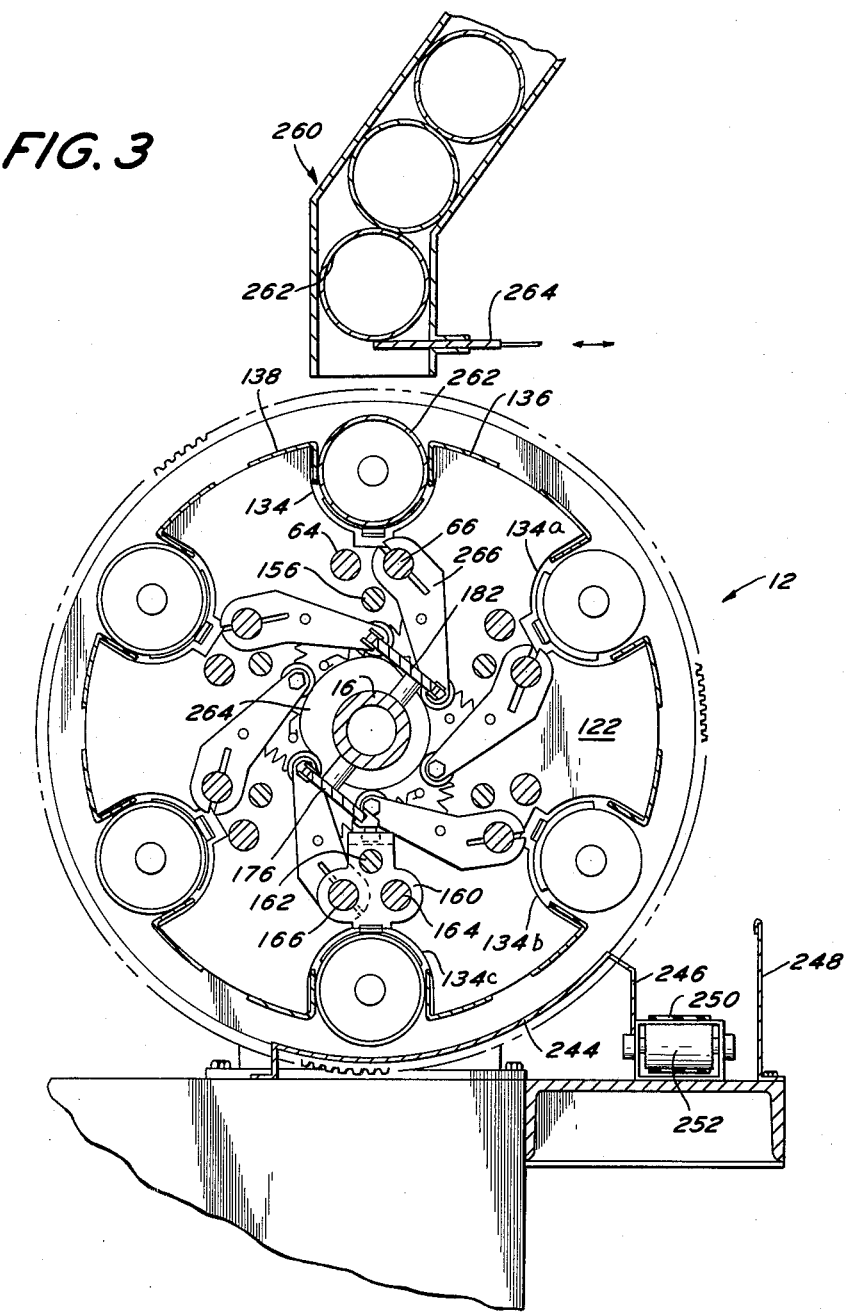
FIGURE 3 is a sectional view taken along the lines 3—3 of FIGURE 1B.

A shown more clearly in FIGURES 1B and 3, the plate 122 of the loading turret 12 is provided with spaced notches 134, 134a, 134b, 134c, etc. The number of such notches corresponds with the number of mandrels on the mandrel turret 14. Each notch is provided with a pair of guide plates 136 and 138. Each guide plate has a flange portion disposed within the notch. The distance between such flange portions corresponds with and is in line contact with diametrically opposite points on the tube to be cut. Conventional means are provided to adjust the position of the various guide plates 136 and 138.

The loading turret 12 is provided with a feed carriage designated generally as 140 and a strip carriage 142. Carriage 140 is designed to transfer tubes from the loading carriage 12 onto the mandrels of the turret 14. Carriage 142 is designed to simultaneously strip a tube which has been cut from the mandrels of the turret 14. As will be made clear hereinafter, the carriages 140 and 142 function simultaneously in opposite directions. As point out above, the carriages 142 and 140 are designed to transfer tubes onto the mandrels and remove cut tubes from the mandrels notwithstanding the fact that the mandrels are continuously rotating.

Feed carriage 140 is provided with a semi-circular member 144 secured to a front block 146 as shown more clearly in FIGURE 1B. Carriage 140 also includes a semi-circular member 148 secured to and projecting from a rear block 150. The blocks 146 and 150 are interconnected for simultaneous movement by means of a connector rod 156. A concave supporting surface 152 is provided adjacent the member 144. A concave supporting surface 154 is provided adjacent member 148.

A tube on the loading turret 12 is supported by the surfaces 152 and 154 which are spaced apart for a distance slightly less than a length of the tube. The surfaces 152 and 154 terminate in a radially outwardly directed shoulder which abuts the ends of the tube. Hence, reciprocation of the carriage 140 results in positive reciprocation of the tube to be transferred and supported thereby.

The block 146 is a slave to the block 150 as a result of the connector rod 156. It will be noted that the connector rod 156 extends through a hole in the plate 122 of the loading turret 12. The blocks 146 and 150 are reciprocally supported by the shafts 64 and 66 which extend for the full length of the machine 10. It will be appreciated that a loading carriage 140 is provided for each of the notches 134, 134a, 134b, etc. Carriage 142 is identical with carriage 140 and will be a feeding carriage when disposed in the feeding position. Likewise, when a tube has been cut, the feed carriage 140 will function as a stripping carriage to remove the cut lengths of tubing from the mandrel.

The carriage 142 includes a front block 158 and a rear block 160 interconnected by connector rod 162. Rod 162 extends through and is reciprocally supported by the plate 122 in the same manner as rod 156. Each of the blocks 158 and 160 is provided with structure cooperating with the tube on one of the mandrels in the same manner as described above in connection with carriage 40. As shown more clearly in FIGURE 3, the block 160 is reciprocally supported by the shafts 164 and 166 which correspond with the shafts 64 and 66.

The rear block for each of the carriages is provided with a channel 168 on its innermost surface. Each carriage continuously rotates with the loading turret 12. As each rear block approaches its uppermost position, it receives a pin 170 within its channel for a small portion of its arcuate rotary movement.

The pin 170 is secured to a chain 172. Chain 172 extends around sprocket 174 and is guided by a plate 176. The plate 176 has a straight upper edge which is parallel to the longitudinal axis of the central shaft 16. Plate 176 is fixedly secured to the stationary shaft 16.

Figure 7:
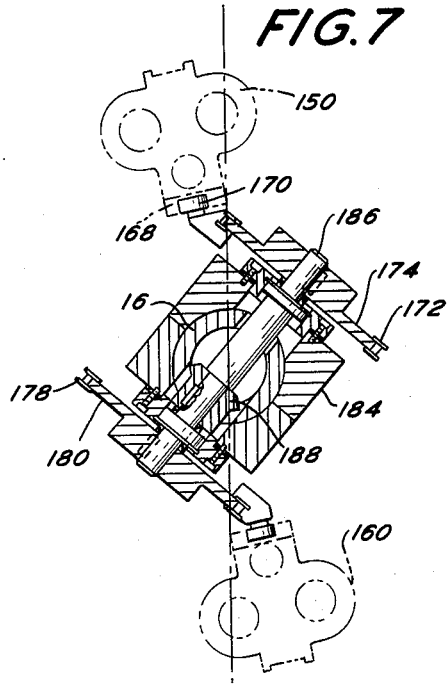
FIGURE 7 is a sectional view taken along the lines 7—7 in FIGURE 1B.

As shown more clearly by a comparison of FIGURES 1B and 7, a pin 170' is adapted to cooperate with the rear block of the carriage 142 which is in the stripping position. Pin 170' is connected to a chain 178. Chain 178 extends around sprocket 180 and plate 182. Plate 182 is diametrically opposite plate 176. Plate 182 has a straight edge on its lowermost surface which is parallel to the longitudinal axis of shaft 16.

Figure 9:
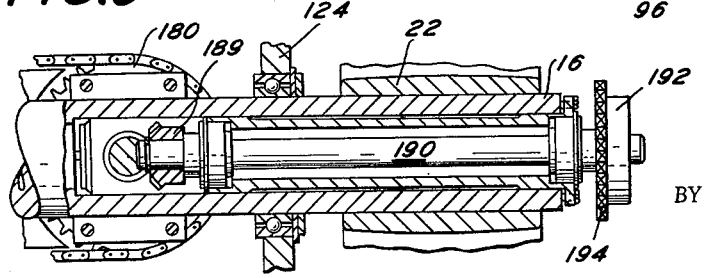
FIGURE 9 is a sectional view taken along the lines 9—9 in FIGURE 1B.

A housing 184 surrounds the central shaft 16 as shown more clearly in FIGURES 1B and 7. The housing 184 is composed of two halves. The sprockets 174 and 180 are rotatably supported by a shaft 186 extending through the housing 184 and shaft 16. A bevel gear 188 surrounds and is keyed to the shaft 186. Bevel gear 188 is in meshing engagement with bevel gear 189. The latter gear is secured to shaft 190 which extends through the right-hand end of the shaft 16 as shown more clearly in FIGURE 9. Shaft 190 terminates in a sprocket 192. A chain 194 extends around sprocket 192 and sprocket 196. Sprocket 196 is keyed to a shaft 198.

Shaft 198 is part of a means for intermittently simultaneously rotating the sprockets 174 and 180 in opposite directions. Such means utilizes shaft 198 as an output shaft. As shown more clearly by comparison of FIGURES 2 and 6, a sprocket 200 is keyed to shaft 198. A chain 204 extends around sprocket 200 and a second sprocket 202. The ends of chain 204 are interconnected by a link member 206.

The link member 206 is secured to the side struts 208 and 210 of a reciprocating carriage. The reciprocating carriage includes sleeves 212 and 214 guided for reciprocation on shafts 216 and 218. The shafts 216 and 218 are supported by standards in spaced relation from a base plate 220.

Figure 6:
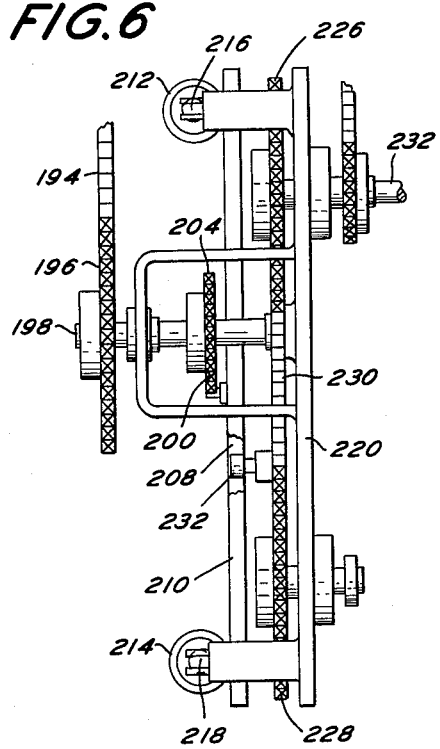
FIGURE 6 is a view taken along the lines 6—6 in FIGURE 2.

Sprockets 222, 224, 226 and 228 are rotatably supported by base plate 220 in a plane which is intermediate the plate 220 and the plane of the sprockets 200 and 202 as shown more clearly in FIGURE 6. A chain 230 extends around the sprockets 222–228. A pin 232 extends from the chain 230 to a point between the struts 208 and 210. Sprockets 222, 224 and 228 are idler sprockets. Sprocket 226 is driven from shaft 132 which in turn is driven from the main drive shaft 90.

As shown more clearly in FIGURE 3, a curved plate 244 is disposed beneath the loading turret 12 and extends from a position between 6 o'clock and 7 o'clock to a position between 4 o'clock and 5 o'clock. The plate 244 has a portion extending radially outwardly and terminating in a guide plate 246. A guide plate 248 is provided in spaced relationship to the plate 246. A conveyor is provided between the plates 246 and 248. The conveyor includes an endless belt 250 extending around an idler roller 252 and a driven roller 254 (see FIGURE 2). Roller 254 is driven by means of a belt 256 extending around a pulley on the output shaft of a motor 258 and a pulley integral with the roller 254.

The remaining structural elements of the machine 10, not heretofore mentioned, are more clearly oriented with respect to the present invention in regard to the following description of operation.

*Operation*

A dispensing means 260 is provided above the loading turret. Any one of a wide variety of dispensing means may be utilized with the machine 10. As illustrated, the dispensing means includes a guide chute having a plurality of cardboard tubes 262 disposed one behind the other. A feeding member 264 is provided to feed the tubes 262, one at a time, into the various notches 134, 134a,, 134b, etc., on the loading turret 12.

In the various figures of the drawing, the loading turret 12 and mandrel turret 14 are continuously rotated in a counterclockwise direction. At minimum speed, such rotation will be 10 revolutions per minute.

The tube 262 which has been dispensed into the notch 134 is supported at its ends by the surfaces 152 and 154 on the carriage 140 and is in line contact with the guide plates 136 and 138. At this point, the sprockets 174 and 180 are rotated in a direction to cause the pin 170 to reciprocate to the left in FIGURE 1B thereby transferring the tube 262 onto the mandrel 36. The mandrel 36 has been prebiously oriented so as to be in line with the notch 134 and is rotating with the tube 262 in the same direction at the same rate of speed.

The carriage 140 remains in its left-hand position as the mandrel 36 and tube 262 continue to rotate in a counterclockwise direction. As the mandrel 36 approaches a position approximating 10 o'clock, the pulley 48 engages the belt 74 and is rotated thereby. Such rotation of the mandrel 36 also results in a rotation of the tube 262 supported thereby. As the mandrel 36 continues to rotate in a counterclockwise direction, it reaches a position between 8 and 9 o'clock at which position the tube 262 is engaged by each of the knives 160. The knives 160 cut the tube 262 into a plurality of lengths. Due to the interference positions between the knives 160 and the tube 262, the knife units 96 tend to rotate in a clockwise direction in FIGURE 4. Such rotation is opposed by the bias imposed thereon by the pressure in cylinder 120. As the tube 262 which has been cut into a plurality of lengths continues to rotate in a counterclockwise direction and the rear block 150 approaches the 6 o'clock position, its channel 168 will be disposed on opposite sides of the pin 170'. At this point, pin 170' will be reciprocated to the right in FIGURE 1B thereby stripping the cut lengths of tubing from the mandrel on which they were supported. Such cut lengths of tubing will fall onto the curved plate 244 and be pushed therealong to the 4 o'clock position in FIGURE 3. At such point, the cut lengths of tubing will fall or roll onto the belt 250 to be conveyed to a remote point.

While the carriage 140 was being reciprocated to the left in FIGURE 1B as described above, the carriage 142 was being reciprocated to the right in FIGURE 1B at the same time. Since the carriage for each of the notches 134, 134a, 134b, etc. is identical, it will be seen that the carriage in the region of the 12 o'clock position will be reciprocated to feed a tube onto a mandrel while the carriage in the 6 o'clock position is being reciprocated to strip cut lengths of a tube from a mandrel. All of the above operations are accomplished while the mandrels, mandrel turret, and loading turret are continuously rotating in the same direction at the same rate of speed.

The reciprocation of the pins 170 and 170' is effected by the means illustrated in FIGURES 2 and 6 which in turn is structurally interrelated with the sprockets 170 and 180. Such means is responsive to the rotation of the main drive shaft 90 which is coupled to the shaft 232. Rotation of shaft 232 causes rotation of sprocket 226. Rotation of sprocket 226 causes movement of the pin 232 on chain 230 around the sprockets 222, 224, 226, and 228. As the pin 232 reciprocates vertically in FIGURE 2, the side struts 208 and 210 are stationary. As the pin 232 passes around the upper right-hand quadrant of sprocket 226, there is harmonic acceleration of the pin 232 with subsequent reciprocation to the left of the carriage which includes the side struts 208 and 210. As pin 232 reaches the 12 o'clock position of sprocket 226, and continues to move to the left in FIGURE 2, the carriage reciprocates to the left with constant velocity.

As pin 232 reaches point 236 on sprocket 222, the constant velocity movement to the left stops and there is harmonic deceleration to the point 238. From point 238 to point 240, the pin 232 moves between the struts 208 and 210. Hence, there is a dwell period between the reciprocation of the carriage from right to left and vice versa. Between point 240 and point 242 on sprocket 224, the pin 232 is subjected to harmonic acceleration again. As pin 232 moves to the right in FIGURE 2 from point 242, there is constant velocity of the carriage again.

Hence, it will be seen that the carriage is subjected to harmonic acceleration, constant velocity to the left in FIGURE 2, harmonic deceleration, dwell, harmonic acceleration, constant velocity to the right in FIGURE 2, harmonic deceleration, dwell, etc. Since the carriage is interconnected with chain 204 by link member 206, output shaft 198 is subjected to the same cycle described above. However, shaft 198 rotates while the carriage is being reciprocated. The cyclic operation of the shaft 198 is transmitted to the sprockets 174 and 180 by way of sprocket 196, chain 194, sprocket 192, shaft 190, gears 188 and 189, and shaft 186.

Since the rotation of shaft 232 is responsive to the main drive shaft 90, a proper choice of sprockets and other relationships for a predetermined mechanical advantage will automatically result in the pins 170 and 170' being reciprocated at the exact time that they are within a channel on the rear block of the carriages. The length of the stroke of the carriage and guide struts 208 and 210 is a direct function of the stroke of the carriages 140. In an operative embodiment, the struts 208 and 210 have a stroke which is ⅓ the length of the stroke of the carriages 140.

While the tubes are being stripped from a mandrel in the 6 o'clock position, and while such mandrels are rotating to the 12 o'clock position, the back up rollers are spaced from the mandrels as a function of the relationship between the cams 52 and 264 and their cam followers as illustrated more clearly in FIGURE 4. As pointed out above, the cams are stationary. As the turrets 12 and 14 rotate in a counterclockwise direction, the cam followers are cammed radially outwardly thereby rotating the cam follower arms. Before the cam follower arms are rotated, a new uncut tube 262 will have been telescoped over the mandrel in the 12 o'clock position. Before the last-mentioned mandrel has reached the 10 o'clock position, the cam follower arm will have been rotated about shaft 66. Such rotation causes the bracket arms 56 and 60 to move towards each other thereby resulting in contact between the back up rollers and the tube 262.

The back up rollers support the tube and rollingly contact the same between the 10 o'clock position and the 8 o'clock position. In this regard, it will be remembered that the mandrels are supported in cantilever fashion from the plates 28 and 30 of the turrent mandrel 14. As the mandrels approach the 7 o'clock position, the spring bias on each of the follower arms causes the cam follower to move radially inwardly with respect to the central shaft 16 which in turn results in the bracket arms moving away from the surface of the cut lengths of the tube.

Hence, it will be seen that the mandrels receive a tube in the 12 o'clock position, the tube is supported by back up rollers between the 10 and 8 o'clock positions, the tube is cut into predetermined lengths between the 9 and 8 o'clock positions, while the tubes are rotating about their longitudinal axis between the 10 and 8 o'clock positions, and the cut lengths of the tube are stripped in the 6 o'clock position. Between the 6 o'clock and 12 o'clock positions in a counterclockwise direction, the mandrels do not have a tube telescoped thereover.

Hence, it will be seen that a novel cutting machine has been provided wherein a loading turret and mandrel turret are continuously rotatably driven in the same direction at the same rate of speed. A feeding means is provided to feed tubes onto continuously rotating mandrels and remove the same after the tubes have been cut into a plurality of lengths by cutting means adjacent the periphery of the rotating mandrels.

The present invention may be embodied in other specific forms without departing from the spirit or essential attributes thereof and, accordingly, reference should be made to the appended claims, rather than to the foregoing specification as indicating the scope of the invention.

It is claimed:

1. A cutting machine for recutting lengths of a tube into a plurality of smaller lengths comprising a mandrel turret, mandrels fixedly supported in cantilever fashion from said turret, means supporting said mandrel turret for continuous rotation, the longitudinal axes of said mandrels being substantially parallel to the axis of rotation of said turret, a cutting means rotatably supported in a relatively fixed position adjacent the peripheral path of said mandrels as said mandrels are rotated by said turret for cutting tubes supported by said mandrels, and means for feeding a tube onto said mandrels and simultaneously removing a tube from said mandrels as said mandrels are continuously and uniformly rotated about the axis of said turret, said feeding means including a loading turret, said turret being mounted for rotation about a common axis, and means for simultaneously rotating said turret in the same direction at the same rate of speed.

2. A machine in accordance with claim 1 wherein said feeding means includes a reciprocable carriage disposed within said loading turret.

3. A cutting machine comprising a loading turret, a mandrel turret, mandrels supported from said mandrel turret and extending toward said loading turret, means supporting said turrets for rotary motion about a common axis, means for continuously rotating said turrets in the same direction at the same uniform rate of speed, cutting means in a relatively fixed position adjacent the peripheral path of said mandrels, first means for transferring the tube from said loading turret onto one of said mandrels while said one mandrel is being rotated about said common axis, second means for removing cut lengths of a tube from another of said mandrels while said other mandrel is being rotated about said common axis, said loading turret having a plurality of tube receiving positions corresponding in number to the number of mandrels, each tube receiving position being in line with a mandrel, said means for transferring the tube onto said one mandrel including a carriage disposed within said loading turret.

4. A machine in accordance with claim 3 wherein said means for removing cut lengths of a tube from another mandrel includes a second carriage, and means including pin means interconnecting said carriages with said means for continuously rotating said turrets so that said carriages reciprocate as a function of the rotary disposition of said turrets.

5. A cutting machine comprising a loading turret, a mandrel turret, mandrels supported in cantilever fashion from said mandrel turret and extending toward said loading turret, means supporting said turrets for rotary motion about a common axis, means for continuously rotating said turrets in the same direction at the same rate of speed, cutting means rotatably supported in a relatively fixed position adjacent the peripheral path of said mandrels, means for transferring a tube from said loading turret onto one of said mandrels while said one mandrel is being rotated by said mandrel turret, and means for simultaneously removing cut lengths of a tube from another of said mandrels while said other mandrel is being rotated about the axis of said mandrel turret.

6. A machine in accordance with claim 5 wherein said means for transferring a tube onto said one mandrel includes a reciprocating carriage for supporting an uncut tube prior to feeding the same onto said one mandrel, and elements interconnecting said carriage with said means for continuously rotating said turrets so that said carriage is reciprocated as a function of the rotary disposition of said turrets.

7. A machine in accordance with claim 5 wherein said loading turret has a plurality of tube receiving positions corresponding in number to the number of mandrels, each tube receiving position being in line with a mandrel, said means for transferring a tube onto said one mandrel including a first carriage, said means for removing cut lengths of a tube from another mandrel including a second carriage, and intermittently driven pin means interconnecting said carriages with said means for continuously rotating said turrets so that said carriages reciprocate as a function of the rotary disposition of said turrets.

8. A machine in accordance with claim 5 including a pair of back up rollers for each mandrel, said back up rollers being supported radially inwardly from the longitudinal axes of said mandrels, and means for moving said back up rollers toward their respective mandrels only during a portion of the rotary cycle of said mandrels.

9. A machine in accordance with claim 8 wherein said last-mentioned means includes a cam supported adjacent the ends of said mandrels and the common axis for said turrets.

10. A machine in accordance with claim 5 including means for selectively rotating said mandrels about their longitudinal axes during only a portion of the rotary movement of said mandrels with respect to said common axis.

11. A cutting machine comprising a mandrel turret, a plurality of mandrels supported in cantilever fashion by said turret, means for rotating said mandrels about an axis substantially parallel to the longitudinal axes of said mandrels, a loading means juxtaposed to the free end of said mandrels for feeding tubes onto and for removing tubes from said mandrels as said mandrels are continuously rotated, means for continuously rotating said turret and mandrels at a uniform rate of speed about the longitudinal axis of said turret, a cutter drive shaft supported radially outwardly beyond the peripheral path of said mandrels, a plurality of cutter units at spaced points along the length of said cutter drive shaft, each unit including a rotatably driven knife, and means for individually adjusting the angular disposition and pressure of each knife with respect to said cutter shaft.

12. A cutting machine comprising a mandrel turret, a plurality of mandrels supported in cantilever fashion from said turret, means supporting said turret for rotation about an axis substantially parallel to the longitudinal axes of said mandrels, means for continuously rotating said turret, means juxtaposed to the free end of said mandrels for feeding tubes onto and for removing tubes from said mandrels while said mandrels are being continuously rotated about the axis of said turret, said last-mentioned means including a transfer carriage for each mandrel, first and second pins supported for movement in opposite directions, and means for simultaneously causing said first pin to move one of said carriages toward said turret while said second pin moves one of said carriages away from said turret, and means for cutting tubes while said tubes are supported by said mandrels.

13. A method of recutting tubes comprising the steps of continuously rotating a loading turret and a mandrel turret in the same direction at the same uniform rate of speed, feeding tubes to said loading turret, transferring a tube from said loading turret to said mandrel turret and simultaneously stripping cut lengths of said tube off said mandrel turret while said turrets are continuously rotating, and cutting said tube on said mandrel turret while said mandrel turret is continuously rotating.

14. A machine for cutting cardboard tubes of uniform diameter comprising a loading turret, a mandrel turret, mandrels supported in cantilever fashion from said mandrel turret extending toward said loading turret, means supporting said turrets for rotary motion about a common axis, means continuously rotating said turrets in the same direction at the same rate of speed, cutting means rotated by said mandrel turret, means for transferring a tube from said loading turret onto one of said mandrels while said one mandrel is being rotated by said mandrel turret, and means for simultaneously removing cut lengths of a tube from another of said mandrels while said other mandrel is being rotated about the axis of said mandrel turret, said means for transferring a tube onto said one mandrel including a reciprocating carriage for supporting an uncut tube prior to feeding the same onto said one mandrel, and intermittently driven means interconnecting said carriage with said means for continuously rotating said turret so that said carriage is reciprocated as a function of the rotary disposition of said turret.

References Cited by the Examiner
UNITED STATES PATENTS

| 460,317 | 9/1891 | Whitney | 82—101 X |
| 800,649 | 10/1905 | Hurd | 82—85 |
| 923,554 | 6/1909 | Mill | 82—85 |
| 1,289,388 | 12/1918 | Calleson | 82—85 |
| 1,534,999 | 4/1925 | Watson | 82—101 X |
| 1,647,358 | 11/1927 | Hubbard | 82—101 X |
| 2,298,366 | 10/1942 | Gladfelter | 82—58 X |
| 2,670,576 | 3/1954 | Hocket | 82—85 X |
| 2,785,750 | 3/1957 | Hohl | 82—85 X |

WILLIAM W. DYER, JR., *Primary Examiner.*

RICHARD H. EANES, JR., *Examiner.*